United States Patent Office 3,146,069
Patented Aug. 25, 1964

3,146,069
METHOD OF PREPARING PHOSPHORUS PENTA-
SULFIDE OF CONTROLLED REACTIVITY
Stephen Robota, North Tonawanda, N.Y., assignor to
Hooker Chemical Corporation, Niagara Falls, N.Y., a
corporation of New York
No Drawing. Filed May 27, 1959, Ser. No. 816,045
4 Claims. (Cl. 23—206)

This invention relates to a method of producing phosphorus sulfides of controlled reactivity. The concept of this invention resides in an annealing step in the process for the production of phosphorus pentasulfide.

In a co-pending application, now Patent 3,023,086, it was disclosed that the reactivity of phosphorus pentasulfide can be controlled by controlled cooling of the molten phosphorus pentasulfide in the phase transition temperature range. The use, however, of highly reactive phosphorus pentasulfide at the present time is quite limited.

One of the common uses of phosphorus pentasulfide is in the making of diethyl dithiophosphoric acid by reacting with ethanol. The reactive form of phosphorus pentasulfide reacts many times as fast as the normally available commercial grade, and it is thus difficult or impossible to control the reaction.

A phosphorus pentasulfide of reactivity between the low reactive and highly reactive product is more desirable commercially. This invention provides a method for reducing the reactivity of highly reactive phosphorus pentasulfide to a reactivity more in line with that type in demand commercially. It has been found that if this highly reactive form of phosphorus is annealed after initial cooling, a form of phosphorus pentasulfide is obtained which is presently commercially more desirable. This invention provides a method for phosphorus pentasulfide reactivity control by reducing reactivity by means of two related controlling factors: (1) temperature and (2) time. Such a method can be industrially useful since high reactivity as obtained by flaking, or other means can be reduced by annealing to values acceptable for existing processes. The annealing step in such cases is relatively simple and involves the raising of solid phosphorus pentasulfide to a pre-determined temperature for a pre-determined length of time. Annealing can also be practiced on freshly solidified phosphorus pentasulfide, just *past phase transition* by maintaining annealing conditions in terms of time and temperature. No reheat in this case is required. The temperatures necessary for annealing phosphorus pentasulfide can be obtained by means of known industrial heating methods. After annealing the phosphorus pentasulfide may be cooled at any convenient rate, provided allowance is made for whatever additional annealing is obtained during the cooling period.

The following examples illustrate various processes conducted that clearly illustrate the annealing effect of this invention. These examples are not intended to limit the invention to the particulars herein illustrated. The reactivity figure of the phosphorus pentasulfide below referred to is that percentage of the phosphorus pentasulfide which reacts with ethanol in one minute.

EXAMPLE I

*Annealing Tests at Elevated Temperatures*

Highly reactive phosphorus pentasulfide from a flaker run was used. This phosphorus pentasulfide was distilled prior to flaking and had a phosphorus content of 28.32%. About 100 cc. of these loosely-packed flakes were charged to a 130-ml. test tube. A nitrogen atmosphere was maintained around the sample to avoid oxidation. A (−10° to 360° C.) thermometer extended into the phosphorus pentasulfide sample.

The phosphorus pentasulfide sample contained in the test tube was then immersed in an oil bath, the temperature of which was controlled by a Variac. The level of immersion in the oil bath was such that phosphorus pentasulfide was below the level of the oil. The bath temperature was then raised gradually until the temperature of the phosphorus pentasulfide sample reached the desired level. It was held at this temperature for the pre-determined annealing periods. Subsequently, the phosphorus pentasulfide was withdrawn, cooled and tested. The comparative effects of annealing time and temperature on reactivity at this temperature is shown below:

TABLE 1.—EFFECT ON REACTIVITY OF ANNEALING OF PHOSPHORUS PENTASULFIDE AT ELEVATED TEMPERATURES

| Annealing Time | Annealing Temperature | Reactivity |
|---|---|---|
| Control (no annealing) | No annealing | 100 |
| 1 minute | 245° C | 25 |
| Do | 265° C | 20 |
| Do | 278° C | 17 |
| 1 hour | 245° C | 20 |
| Do | 265° C | 17.4 |

EXAMPLE II

*Annealing at 240° C.*

Annealing tests were conducted as described in Example I, except that sample tubes were immersed in a bath held at a temperature of 240° C. Annealing was conducted for specified periods after which the test tube was withdrawn and subjected to normal atmospheric cooling. The reduction in reactivity by annealing is shown in the table below:

TABLE 2.—EFFECT OF ANNEALING TIME ON REACTIVITY OF PHOSPHORUS PENTASULFIDE AT AN ANNEALING TEMPERATURE OF 240° C.

| Sample No. | Annealing Time | | Reactivity |
|---|---|---|---|
| 1 | Control Sample, No Annealing | 0 Hr | 99.3 |
| 2 | Annealed for | 1 min | 47.4 |
| 3 | do | 15 min | 33.2 |

EXAMPLE III

*Annealing at 150° C. and 200° C.*

Samples of highly reactive, flaked phosphorus pentasulfide (phosphorus content of 28.29%) were placed in small stoppered Pyrex bottles. The bottles were then purged with high purity $N_2$. For the annealing test they were placed in an electrically heated oven, the temperature of which was automatically controlled.

The effect of annealing time on reactivity at annealing temperatures of 150° C. and 200° C. are shown in Tables 3 and 4.

TABLE 3.—EFFECT OF ANNEALING TIME ON REACTIVITY OF PHOSPHORUS PENTASULFIDE ANNEALED AT A TEMPERATURE OF 150° C.

| Sample No. | Annealing Time | | Reactivity |
|---|---|---|---|
| 1 | Control sample, no annealing | 0 hr | 96 |
| 2 | Annealed for | 1 hr | 91 |
| 3 | do | 4 hrs | 75 |
| 4 | do | 8 hrs | 64 |
| 5 | do | 24 hrs | 40 |

TABLE 4.—EFFECT OF ANNEALING TIME ON REACTIVITY OF PHOSPHORUS PENTASULFIDE ANNEALED AT A TEMPERATURE OF 200° 3.

| Sample No. | Annealing Time | | Reactivity |
|---|---|---|---|
| 1 | Control sample, no annealing | 0 hr | 98 |
| 2 | Annealed for | 1 hr | 66 |
| 3 | do | 4 hrs | 40 |
| 4 | do | 8 hrs | 38 |
| 5 | do | 24 hrs | 37 |

EXAMPLE IV

*Effective of Annealing Temperature on Reactivity*

It was observed in tests conducted at various lengths of time at each temperature level that a limiting reactivity was obtained for each temperature. For best control of the product, the annealing temperature is then better suited than the time. These values are best illustrated by the graph below.

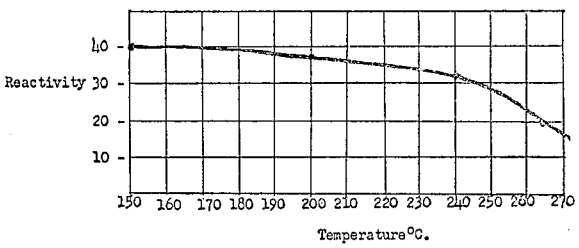

Although this invention has been illustrated in terms of the above examples, various modifications and variations will suggest themselves to persons skilled in the art upon a reading of this disclosure. These are intended to be comprehended within the spirit of this invention.

I claim:

1. A method for producing phosphorus pentasulfide of controlled reactivity which comprises raising the temperature of solidified phosphorus pentasulfide to an annealing temperature in the range between about one hundred and fifty degrees centigrade and a temperature just below the melting point for a period of time up to about twenty-four hours to reduce the reactivity of said phosphorus pentasulfide, and cooling the resulting phosphorus pentasulfide of lowered reactivity to a desired temperature.

2. A method for producing phosphorus pentasulfide of controlled reactivity which comprises reacting phosphorus with sulfur in molten form in approximately the stoichiometric proportions necessary to form phosphorus pentasulfide, cooling the resulting molten phosphorus pentasulfide reaction product to effect solidification thereof, raising the temperature of the solidified phosphorus pentasulfide to an annealing temperature in the range between about one hundred and fifty degrees centigrade and a temperature just below the melting point for a period of time up to about twenty-four hours to reduce the reactivity thereof, and cooling the resulting phosphorus pentasulfide of lowered reactivity to a desired temperature.

3. A method for producing phosphorus pentasulfide of controlled reactivity which comprises reacting phosphorus with sulfur in molten form in approximately the stoichiometric proportions necessary to form phosphorus pentasulfide, solidifying the resulting molten phosphorus pentasulfide reaction product by controlled cooling thereof through the liquid-solid phase transition range, maintaining the resulting solidified phosphorus pentasulfide at an annealing temperature in the range between about one hundred and fifty degrees centigrade and a temperature just below the melting point for a period of time up to about twenty-four hours to reduce the reactivity thereof, and cooling the resulting phosphorus pentasulfide of lowered reactivity to a desired temperature.

4. A method of producing phosphorus pentasulfide of controlled reactivity which comprises raising the temperature of solidified phosphorus pentasulfide to a temperature from about two hundred degrees centigrade up to the melting point for a period of time of several hours and cooling the resulting phosphorus pentasulfide of lowered reactivity to a desired temperature.

References Cited in the file of this patent

UNITED STATES PATENTS

| 2,569,128 | Jones | Sept. 25, 1951 |
| 2,794,705 | Hudson | June 4, 1957 |
| 2,824,788 | Lefforge | Feb. 25, 1958 |
| 2,844,442 | Lefforge | July 22, 1958 |

OTHER REFERENCES

Van Wazer: "Phosphorus and its Compounds," vol. 1, September 29, 1958, pp. 289–294.